United States Patent
Suzuki et al.

[11] Patent Number: 5,301,225
[45] Date of Patent: Apr. 5, 1994

[54] METHOD AND SYSTEM FOR DYNAMICALLY REGULATING A POWER SAVING PERIOD WITHIN A RADIO TELECOMMUNICATION SYSTEM

[75] Inventors: Kazuhiro Suzuki, Koganei; Tsuneo Furuya, Yokohama; Kenzo Urabe, Sendai; Yoshinobu Yamamoto, Fujisawa; Hideya Suzuki, Hachioji, all of Japan

[73] Assignees: Hitachi, Ltd.; Kokusai Electric Co. Ltd.

[21] Appl. No.: 996,150

[22] Filed: Dec. 23, 1992

[30] Foreign Application Priority Data

Dec. 27, 1991 [JP] Japan .................... 3-345835

[51] Int. Cl.5 .......................... H04M 11/00
[52] U.S. Cl. ........................ 379/59; 379/58; 455/343
[58] Field of Search .................. 379/57–59; 455/33.1, 38.3, 127, 343

[56] References Cited

U.S. PATENT DOCUMENTS

| | | | |
|---|---|---|---|
| 4,731,814 | 3/1988 | Becker et al. | 455/127 |
| 5,128,938 | 7/1992 | Borras | 455/343 |

FOREIGN PATENT DOCUMENTS

| | | | |
|---|---|---|---|
| 0016127 | 1/1989 | Japan | 455/343 |
| 0120920 | 4/1992 | Japan | 455/343 |

Primary Examiner—Curtis Kuntz
Assistant Examiner—Dwayne D. Bost
Attorney, Agent, or Firm—Antonelli, Terry, Stout & Kraus

[57] ABSTRACT

A mobile radio telecommunication system and method provide battery-saving receiving of mobile stations. The mobile station autonomously changes the period of intermittence according to the frequency of paging in order to reduce the power consumption of the mobile station. When there has not been paging processing for a fixed time, the mobile station autonomously prolongs the period of intermittence and reregisters a new period of intermittence. In case there has been paging processing, the mobile station shortens the period of intermittence. If blocking has occurred for paging from the cell site, the cell site incorporates blocking information into a broadcast signal, informs the mobile station of occurrence of blocking, and registers a new period of intermittence.

7 Claims, 8 Drawing Sheets

FIG. 1A
IN CASE THERE IS NO PAGING PROCESSING

FIG. 1B
IN CASE THERE HAS BEEN PAGING PROCESSING

FIG. 1C
IN CASE THERE HAS BEEN PAGING BLOCKING

METHOD AND SYSTEM FOR DYNAMICALLY REGULATING A POWER SAVING PERIOD WITHIN A RADIO TELECOMMUNICATION SYSTEM

BACKGROUND OF THE INVENTION

1. Field of the Invention

The present invention relates to a radio telecommunication system and method, and in particular to a radio telecommunication system and method in which power consumption in mobile stations is reduced and blocking is minimized by intermittently receiving paging signals transmitted from a cell site by using a common control channel.

2. DESCRIPTION OF THE RELATED ART

Figure 7:
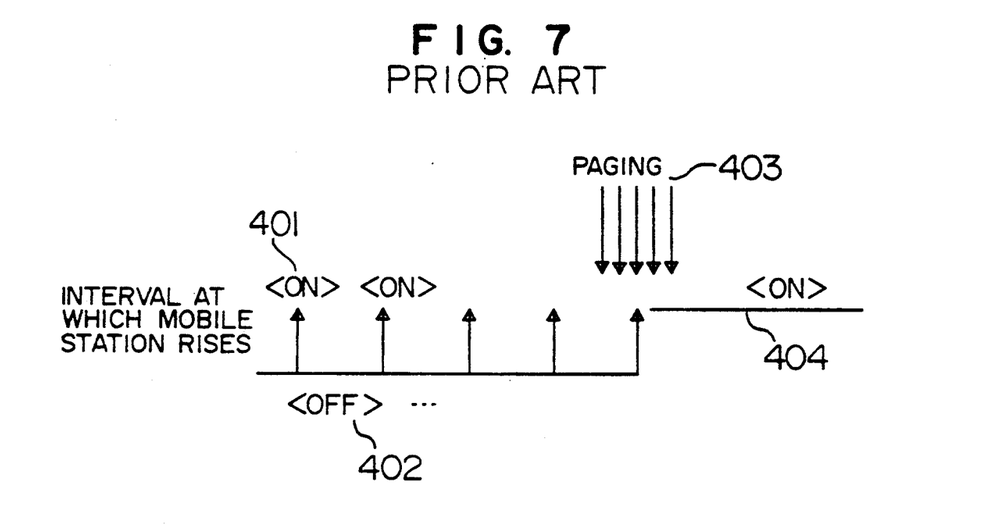
FIG. 7 is a diagram schematically showing battery saving in a prior art mobile station.

A conventional battery-saving receiving processing in a mobile station is schematically shown in FIG. 7. As indicated by 401 and 402, receiving power is turned on/off periodically and repetitively in the mobile station in order to reduce power consumption. Battery saving is performed when the mobile station is waiting for a paging signal or a broadcast signal (event). When receiving power is on, the mobile station checks whether a signal is being transmitted from the cell site or not.

In response to a request from a calling subscriber, the cell site sends a plurality of paging signals to the mobile station. Upon receiving one of the plural paging signals, the mobile station stops the battery saving and turns on receiving power (404) to come into paging connection.

Figure 8:
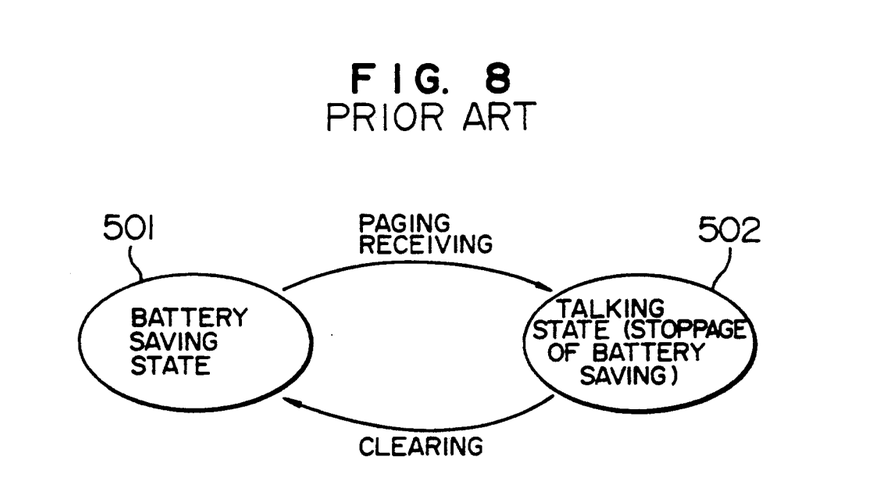
FIG. 8 is a state transition diagram of battery saving in a prior art mobile station.

The above-described battery saving can be represented in a simple state transition diagram as shown in FIG. 8. Upon receiving a paging signal in a battery saving state 501, transition to a talking state (stoppage of battery saving) 502 is made in the mobile station after processing of paging connection. Further, by clearing processing, the mobile station returns from 502 to the original battery saving state 501. The mobile station thus waits for a signal fed from the cell site in waiting state.

A conventional means based upon the above described battery saving is known. In this means, the intermittence period mode is changed by using an internal watch (timer) of the cell cite in order to reduce the power consumption and weight of the mobile station. This approach will now be described by referring to FIG. 9.

Figure 9:
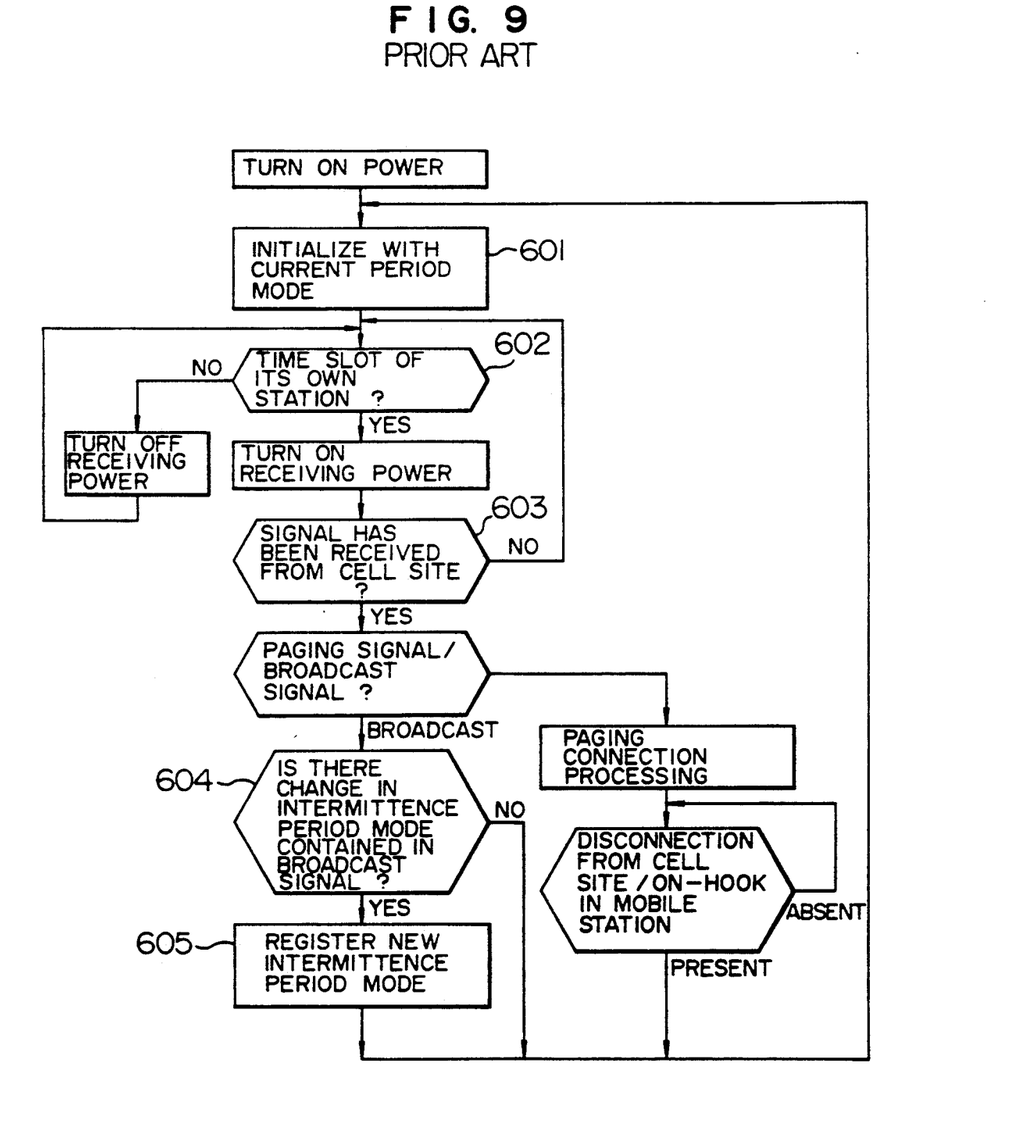
FIG. 9 is a flow chart showing a battery saving method of a prior art mobile station.

First of all, the mobile station recognizes the intermittence period mode registered in the internal memory and performs initialization to set the battery saving mode at step 601. If this is performed at power-on timing, the mobile station performs initialization with a period mode produced when power is turned off.

On the basis of a timer and a flag set by itself, the mobile station itself determines whether the timing is one of intermittent-on or one of intermittent-off at step 602. On the basis of this determination, the mobile station turns off the receiving power for the intermittent-off timing and turns on the receiving power for the intermittent-on timing. Processing at step 602 corresponds to the above described battery saving operation of the mobile station.

At the time of intermittent-on (receiving power on), the mobile station checks at step 603 whether a signal (paging /broadcast) has been transmitted from the cell site. If there is not a signal from the cell site, transition to the step 602 is made. If a signal has been received, transition to paging connection processing /broadcast processing is made.

In case of broadcast processing, the mobile station forms a judgment upon information contained in the broadcast signal. If the mobile station recognizes a difference from the current period mode at step 604, the mobile station registers a new intermittence period mode at step 605 and a transition to the step 601 is made.

In case of paging processing, paging connection is immediately made and a transition to the step 601 is made upon clearing.

Herein, "broadcast signal" means a signal for periodically transmitting information needed in a mobile telecommunication system (such as intermittence period mode) from a cell site.

Thus there is a scheme in which the cell site has a watch and changes the intermittence period mode systematically by using a broadcast signal at appointed times. In this scheme, the period of intermittence is prolonged to lengthen the duration of receiving power off state at night during which the frequency of use of the mobile station is low whereas the period of intermittence is shortened to shorten the duration of receiving power off in the daytime during which the frequency of use is high. Thereby, both reduction of blocking and reduction of power consumption in the mobile station are achieved with a favorable balance. Intervals of receiving power on /off of the mobile station are constant as described before.

SUMMARY OF THE INVENTION

In the above described approach, there is not considered battery saving with due regard to unexpected changes caused in originating and paging frequency of the system including the mobile station and the cell site in the time of emergencies during the night and at the time of irregular events. Further, in such a system that periods of intermittence are changed fixedly according to time zone, turning on and turning off are periodically repeated in the mobile station even if originating and paging processing is not performed for a long time. Thus the mobile station wastes power, resulting in insufficient reduction of power consumption.

An object of the present invention is to provide a radio telecommunication system and method of the system in which the mobile station autonomously changes the period of intermittence to a period suitable for traffic according to the paging frequency in order to hold down blocking to the minimum and reduce the power consumption in the mobile station.

In order to achieve the above-described object, a radio telecommunication system according to one feature of the present invention is configured as described below.

Figure 4:
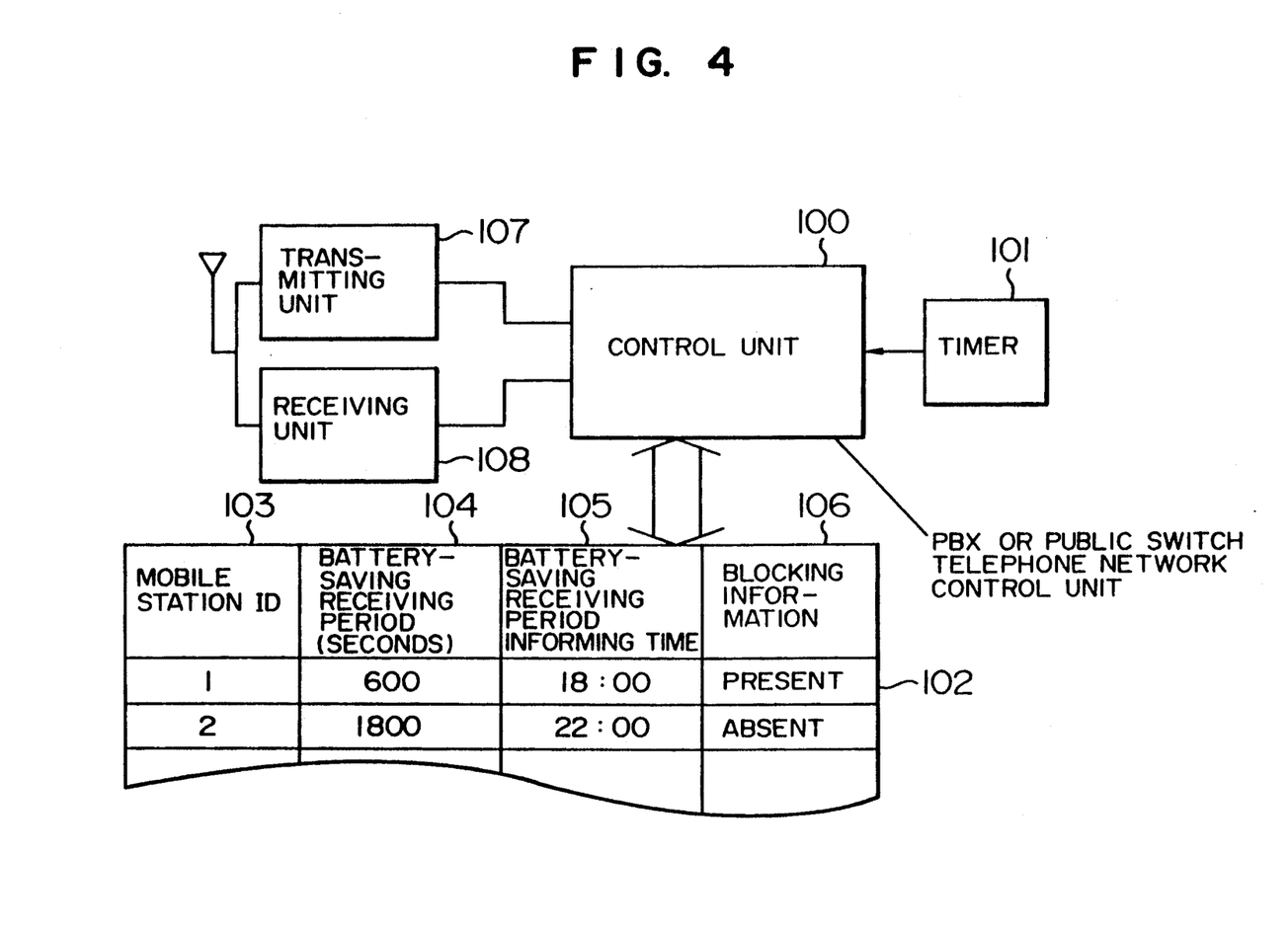
FIG. 4 is a block configuration diagram of a cell site to which the present invention is applied.

(1) Each cell site includes an internal timer (101); a memory (102) for storing a mobile station ID (103) periodically transmitted from each mobile station, battery-saving receiving period information (104, 106), and battery-saving receiving time (105) in association with each other; and a control unit (100) for storing blocking information indicating that blocking has occurred, in case a paging signal is sent to a pertinent mobile station in response to a paging request made by a PBX or a public switched telephone network control unit and an answer is not returned from the mobile station in response to the paging signal, in the memory so as to be associated with a mobile station ID on the memory and for informing the mobile station of the blocking information according to the information on the memory.

Figure 5:
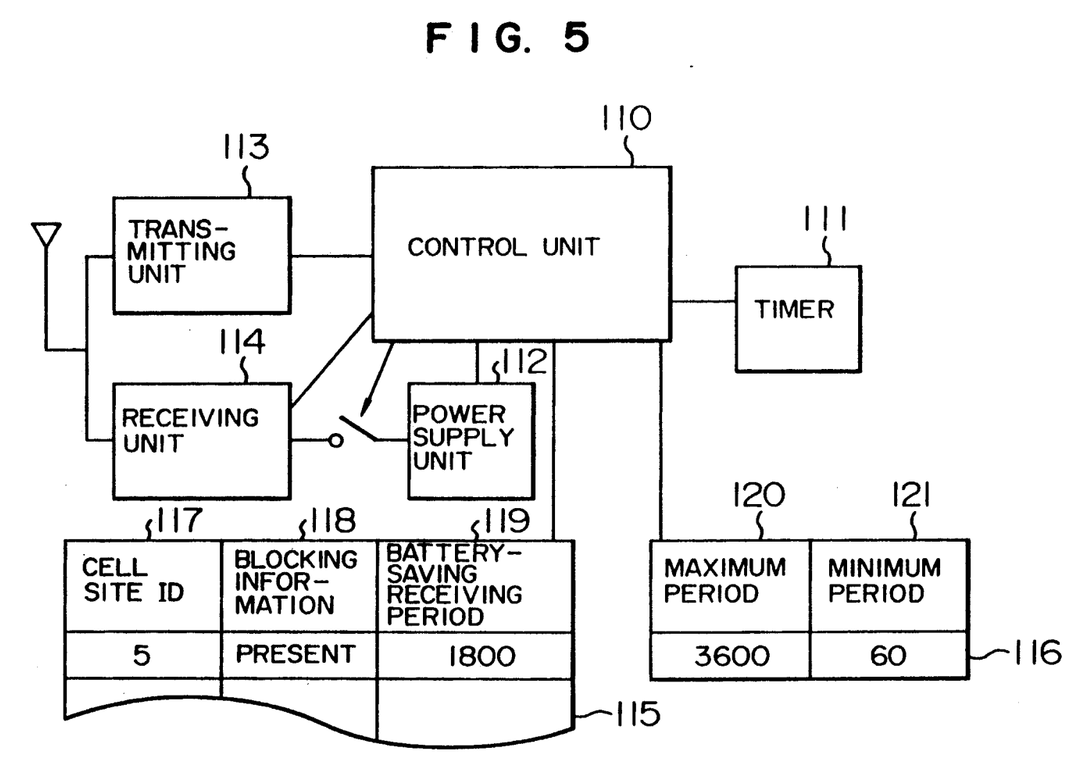
FIG. 5 is a block configuration diagram of a mobile station to which the present invention is applied.

(2) Each mobile station includes an internal timer (111); a memory (115) for storing battery-saving receiving period information (117, 118, 119) to intermittently exercise on /off control over a receiving unit (114); and a control unit (110) for periodically transmitting the battery-saving receiving period information to a cell site and increasing /decreasing the battery-saving receiving period information on the memory according to presence /absence of blocking information fed from the cell site to control the battery-saving receiving period.

The cell site periodically receives battery-saving receiving period information from the mobile station and stores it in the internal memory. When the receiving unit of the mobile station is on, therefore, the cell site can surely inform the mobile station of blocking, which has been caused when the receiving unit of the mobile station has been off, by using the broadcast signal. Further, the mobile station increases or decreases the battery-saving receiving period according to the broadcast signal. Therefore, it is possible to exercise on /off control over the receiving unit at a flexible battery-saving receiving period suitable for the traffic of the mobile station.

The foregoing and other objects, advantages, manner of operation and novel features of the present invention will be understood from the following detailed description when read in connection with the accompanying drawings.

DESCRIPTION OF THE PREFERRED EMBODIMENTS

Outline of battery saving in a mobile station based upon the present invention will now be described by referring to FIGS. 1A, 1B and 1C.

Figure 1A:
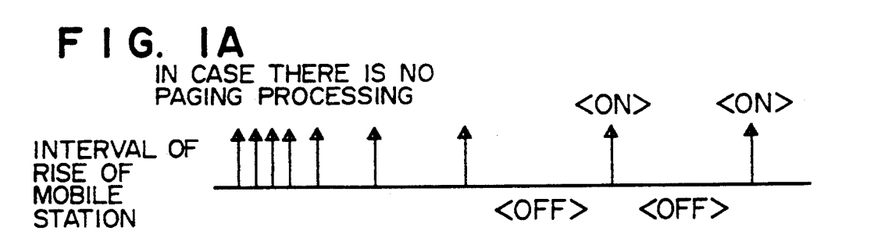
FIGS. 1A, 1B and 1C are diagrams schematically showing battery saving in a mobile station according to an embodiment of the present invention.

FIG. 1A shows the case where there is not originating and paging processing for a long time. In this case, the mobile station lengthens the period of intermittence (period of receiving power-on /off) gradually. When the originating and paging frequency is low, therefore, on-time of receiving power of the mobile station is autonomously shortened and off-time is lengthened. In the long run, the period of intermittence is maximized to have a constant interval.

Figure 1B:
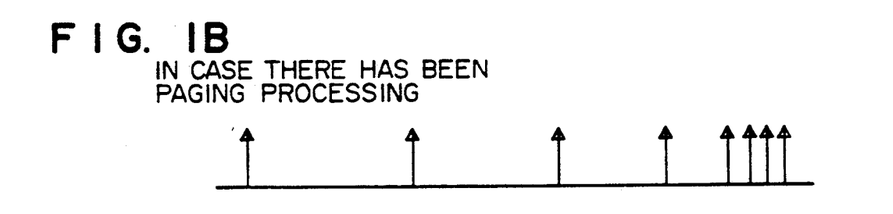

FIG. 1B shows the case where there has been originating and paging processing. For each of originating and paging events, the period of intermittence is shortened. In the long run, the period of intermittence is minimized to have a constant interval.

Figure 1C:
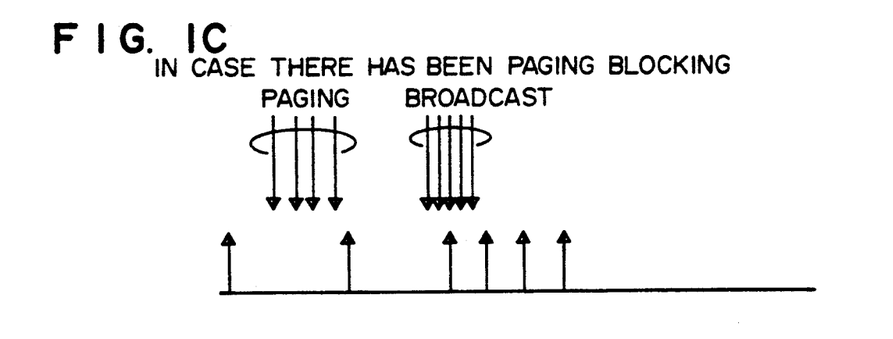

FIG. 1C shows the case where blocking is caused due to a long period of intermittence in the mobile station even if paging is sent from the cell site. At this time, the cell site incorporates blocking information into a broadcast signal and sends the broadcast signal to the mobile station. By referring to this information in the broadcast signal, the mobile station shortens the period of intermittence in the same way as the originating and paging processing to prepare for the next paging.

Figure 2:
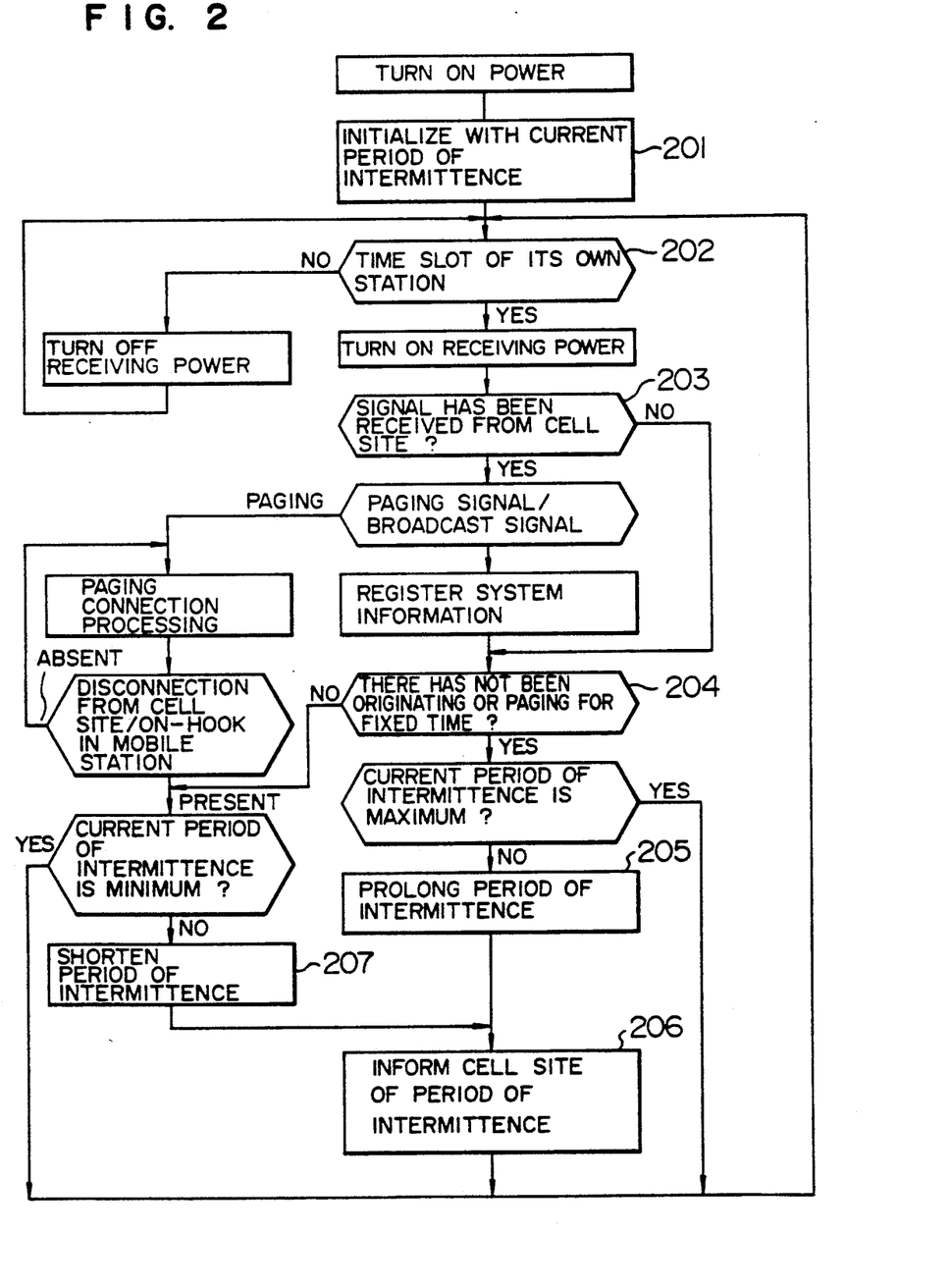
FIG. 2 is a flow chart of battery saving in a mobile station according to one embodiment of the present invention.
Figure 3:
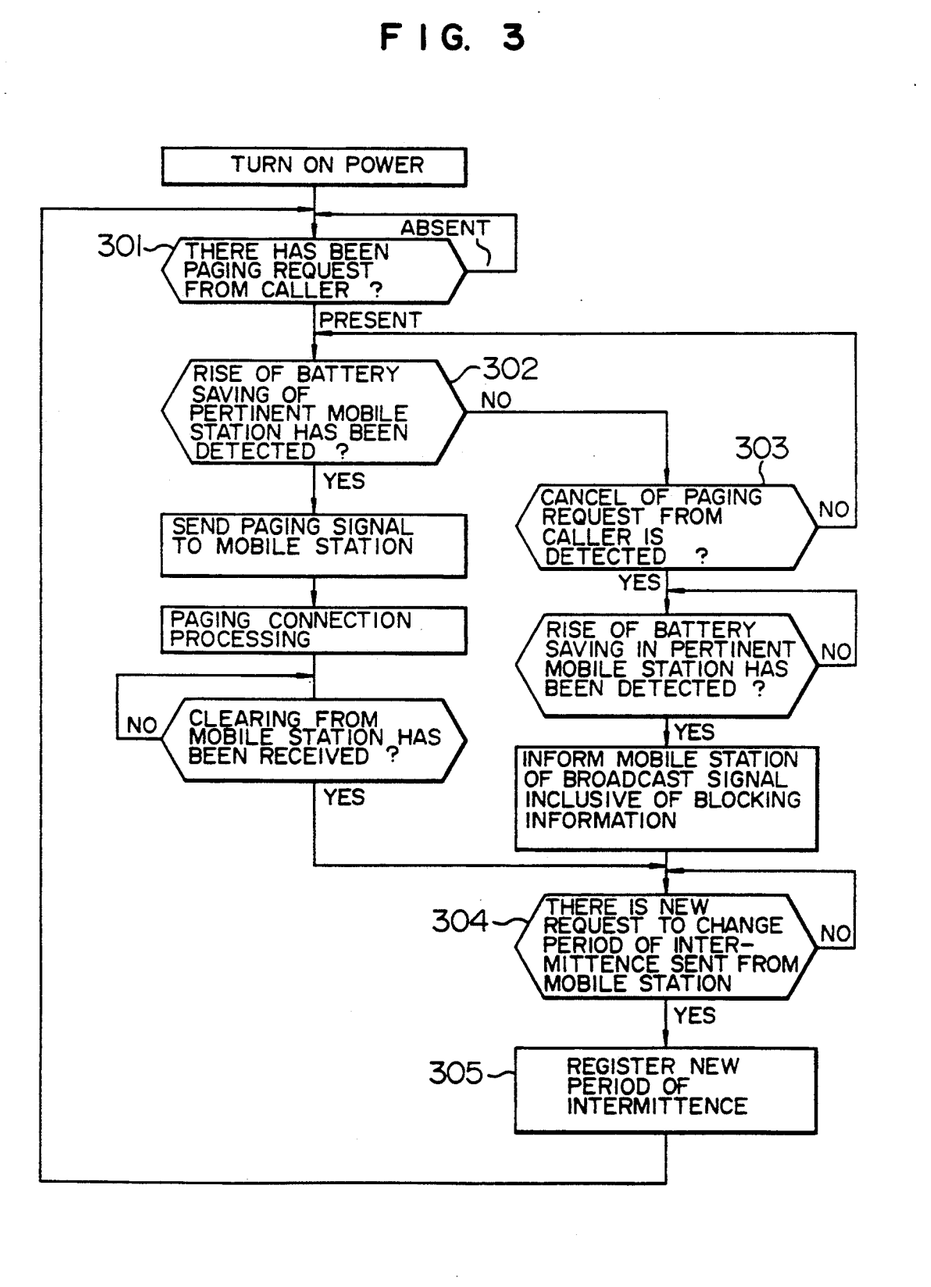
FIG. 3 is a flow chart of paging connection processing in a cell site according to another embodiment of the present invention.

FIGS. 2 and 3 show flow charts of an embodiment of the present invention.

FIG. 2 is a flow chart showing an example of battery saving receiving method of a mobile station. At step 201 in FIG. 2, each mobile station recognizes a current period of intermittence from its own memory at the time of power-on and sets a period of intermittence.

Then at step 202, the mobile station itself determines whether the timing is one of intermittent-on or one of intermittent-off on the basis of a timer and a flag set by itself.

On the basis of this determination, the mobile station turns off the receiving power for the intermittent-off timing and turns on the receiving power for the intermittent-on timing.

At step 203, the mobile station determines whether it has received a signal from the cell site. If a signal has not been received, transition to step 204 is made. If the received signal is a paging signal, paging traffic is accepted and transition to paging processing is made. If a broadcast signal has been received, information indispensable to the radio telecommunication system contained in the broadcast signal is taken out and registered, and thereafter transition to step 204 is made.

If a signal has not been received yet or a broadcast signal has been received at the time of rise of the mobile station, (originating or) paging traffic is checked at step 204 to determine whether there has been (originating or) paging in a fixed time.. If there has been originating or paging, transition to step 202 is made. If there has not been originating or paging for a fixed time and the current period is not the maximum value, processing advances to step 205 where the period of intermittence is prolonged and registered on the memory of the mobile station. And the cell site is informed of the period of intermittence thus changed at step 206.

If clearing processing has been conducted after processing of paging connection processing, the period of intermittence is shortened at step 207 and transition to step 206 is made. At step 206, the cell site is informed of the period of intermittence thus changed. By the configuration heretofore described, the period of intermittence is decreased in the shortening direction when paging traffic is heavy whereas the period of intermittence is increased in the prolonging direction when paging traffic is light. Therefore, the mobile station is capable of autonomously changing the period.

In case there has not been paging traffic for a long time and the period of intermittence has been prolonged, the probability that a paging request made by a receiver is blocked becomes higher. At this time, the mobile station is informed of occurrence of blocking in the cell site, and the period of intermittence is shortened by the mobile station. Flow of this operation is shown in FIG. 3.

In FIG. 3, the cell site first determines at step 301 whether a paging request has been made by a caller. If there is no request, the cell site continues to wait for a paging request while remaining in the stable state. If there is a request, transition to step 302 is made.

Although the cell site has sensed the paging request, the cell site cannot send immediately a paging signal because battery saving is being performed between the cell site and the pertinent mobile station. More specifically, a superframe is used which is formed of a set of TDMA frames shown in FIG. 6A described later. At a leading portion of the superframe the cell site synchronizes with the mobile station to enable transfer of signals such as a control signal therebetween. When the cell site performs a signal reception processing to the mobile station, a waiting processing is effected until a timing or time slot of a frame which is predetermined in the superframe comes. The battery saving is performed for such a waiting period. Now, the superframe format is known from RCR STD-28 established by the Research and Development Center for Radio System, Japan. Therefore, it is necessary to recognize the timing of rise of the pertinent mobile station at the step 302. In parallel with the recognition of the rise, it is also determined at step 303 whether the caller has canceled the paging request.

The flow is divided into the case where paging processing is conducted before the paging request from the caller is canceled at the above described step 303 and the case where the paging request is canceled before the mobile station rises and blocking is thus caused. In case the paging connection has been completed, processing passes through the flow path located under the step 302 and transition to step 304 is made after clearing. In case blocking has been caused, processing passes through the flow path located under the step 303 and the pertinent mobile station is informed of the broadcast signal including blocking information at the timing of rise of the pertinent mobile station and thereafter transition to the step 304 is made.

In case paging connection has been performed, the mobile station considers that the paging traffic has increased at the timing of succeeding clearing, sets a shorter period of intermittence, and informs the cell site of the period of intermittence. Also in case blocking has occurred, the mobile station sets a shorter period of intermittence according to the blocking information contained in the broadcast signal and informs the cell site of the period of intermittence. On the side of the cell site, therefore, arrival of a period of intermittence which is expected to become shorter from the mobile station is waited for.

Once the period of intermittence changed from the mobile station has been registered, processing advances to step 305 where the cell site knows and stores the period of intermittence of the mobile station and transition to step 301 is made.

Even in case blocking has occurred, the mobile station is thus informed of a broadcast signal inclusive of blocking information and hence battery saving receiving adapted to paging traffic can be conducted.

FIG. 4 shows an example of a block configuration diagram of a cell site.

The cell site includes an internal timer 101; a memory 102 for storing a mobile station ID 103 periodically transmitted from a mobile station, battery-saving receiving period information 104, and battery-saving receiving time 105 in association with each other; and a control unit 100 for storing blocking information 106 indicating that blocking has occurred, in case a paging signal is sent to a pertinent mobile station in response to a paging request made by a PBX or a public switched telephone network control unit and an answer is not returned from the mobile station in response to the paging signal, in the memory so as to be associated with a mobile station ID on the memory and for informing the mobile station of the blocking information according to the information on the memory.

FIG. 5 shows an example of a block configuration diagram of a mobile station.

The mobile station includes an internal timer 111, a memory 115 for storing battery-saving receiving period information to intermittently exercise on /off control over a receiving unit, and a control unit 110 for periodically transmitting the battery-saving receiving period information to a cell site and increasing decreasing the battery-saving receiving period information on the memory according to presence /absence of blocking information fed from the cell site to control the battery-saving receiving period.

Figure 6A:
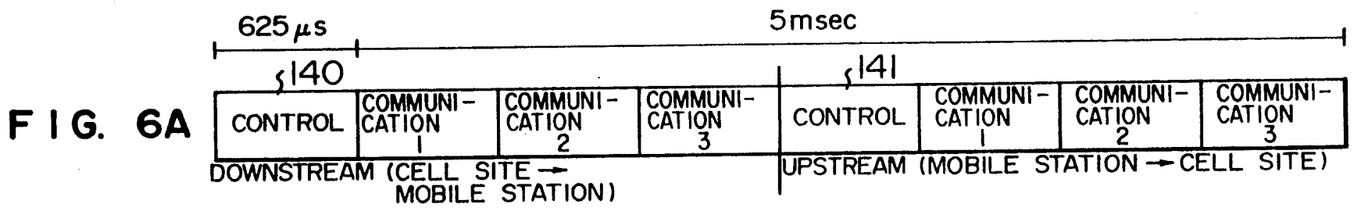
FIGS. 6A, 6B and 6C are diagrams showing the configuration of a TDMA frame between a cell site and a mobile station used in a system to which the present invention is applied.
Figures 6B, 6C:
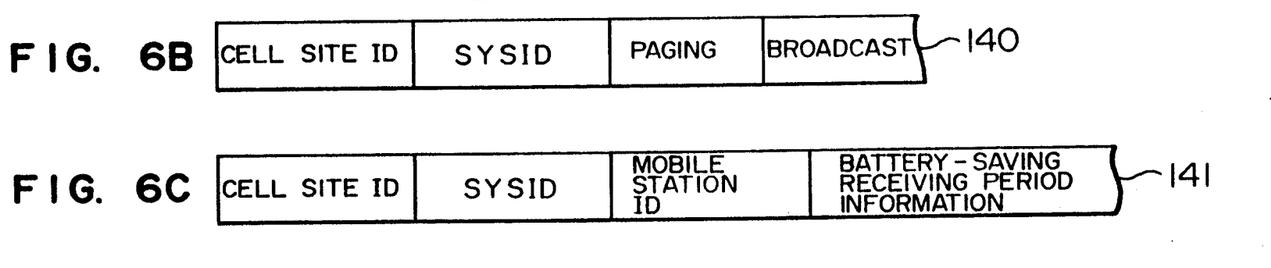

FIGS. 6A, 6B and 6C show the schematic configuration of a TDMA (Time Division Multiple Access) frame used for communication between a cell site and a mobile station.

While taking 5 msec as a period as shown in FIG. 6A, a TDMA frame is assigned to time slots transmitted from the cell site to the mobile station and time slots transmitted from the mobile station to the cell site. The paging signal, broadcast signal, and the like from the cell site are transmitted by using a control slot 140. The battery-saving receiving period information, location registration information, and the like from the mobile station are transmitted by using a control slot 141.

For attaining synchronization of the mobile station, the cell site always transmits down time slots at fixed periods. The mobile station determines timing of up time slots on the basis of the down time slots in the receiving-on interval and transmits necessary information. In case a plurality of cell sites are adjacent, the down control slot is further divided in the initial state under the control of control units such as PBXs connected to respective cell sites and respective cell sites successively transmit the cell site IDs by using slots of their own sites included in slots resulting from division. Further, the mobile station determines the nearest cell site on the basis of electric field strength and the like and performs location registration inclusive of the cell site ID and its own mobile station ID by using an up control slot. The protocol of them is used in a typical radio telecommunication system and detailed description thereof will be omitted.

In accordance with the present invention, the mobile station informs the cell site of the battery-saving receiving period at the time of the location registration or at the time of succeeding battery-saving receiving-on state. Thereby, the nearest cell site successively stores the ID of the mobile station, battery-saving receiving period, and time when the cell site was informed of battery-saving receiving period in its internal memory. Thereby, it becomes possible to exercise autonomously control over the battery-saving receiving period of the mobile station in accordance with teachings of the present invention. Because the cell site is capable of knowing the receiving-on interval of each mobile station and hence it is possible to incorporate the ID of a mobile station, in which blocking has occurred, into a broadcast signal in a sure receiving-on interval and order the mobile station to shorten the battery-saving receiving period of the mobile station.

As described above, the mobile station can determine whether blocking has occurred on the basis of the broadcast signal fed from the cell site. When blocking has occurred, therefore, the mobile station shortens the battery-saving receiving period so long as it is not the minimum period (60 seconds in case of FIG. 5). After the mobile station has informed the cell site of the battery-saving receiving period thus shortened, the mobile station prepares for paging. In case the battery-saving receiving period has been shortened, the blocking information on the memory 118 is cleared. If it is also determined that blocking has occurred on the basis of the broadcast signal when receiving is turned on at the next timing, the battery-saving receiving period is further shortened.

In accordance with the present invention, control is so exercised that the battery-saving receiving period may be lengthened when the paging traffic is light whereas the battery-saving receiving period may be shortened when the paging traffic is heavy as heretofore described in detail. Therefore, flexible period setting according to the paging traffic quantity of the mobile station becomes possible, which has not been possible when using conventional fixed battery-saving receiving period setting according to time zone. Furthermore, even for blocking of paging caused when a long battery-saving receiving period is set, the cell site has means for storing it and making a recovery. Therefore, there is assured relief means for reducing probability of blocking of the next repaging without leaving blocking as it is even if the battery-saving receiving period is prolonged. Thus the present invention brings about many advantages.

We claim:

1. A radio telecommunication system including a plurality of cell sites individually taking charge of predetermined areas and mobile stations having a function of intermittently receiving signals, each of said plurality of cell sites comprising:
   a cell site internal timer for sensing the time;
   a cell site memory storing a mobile station identification periodically transmitted from each mobile station, battery-saving receiving period information, and battery-saving receiving time in association with each other; and
   a cell site control unit rendering said cell site memory to store therein blocking information indicating that blocking has occurred, in case a paging signal is sent to a mobile station in an area in response to a paging request made by a PBX (Private Branch Exchange) or a public switched telephone network control unit and an answer is not returned from the mobile station in response to the paging signal, in said cell site memory so as to be associated with a mobile station ID on said cell site memory and inform the mobile station of the blocking information according to the information on said cell site memory, and each of the mobile stations comprising:
   a mobile station internal timer for sensing the time;
   a mobile station memory storing battery-saving receiving period information to intermittently exercise on/off control over a receiving unit; and
   a mobile station control unit periodically transmitting said battery-saving receiving period information to a cell site and increasing/decreasing the battery-saving receiving period information on said mobile station memory according to presence/absence of blocking information fed from said cell site to control the battery-saving receiving period.

2. The radio telecommunication system according to claim 1, wherein said mobile station further comprises a period width memory storing a maximum period and a minimum period of the battery-saving receiving period and a switch connecting power supply to the receiving unit of the mobile station, and wherein said mobile station control unit increases or decreases said battery-saving receiving period within a range between the maximum period and the minimum period recorded in said period width memory, by referring to said mobile station memory and said mobile station exercises on/off control over said switch.

3. The radio telecommunication system according to claim 1, wherein each of said cell sites stores time when said mobile station has informed the cell site of the battery-saving receiving period and battery-saving receiving period of the mobile station contained in said battery-saving receiving period information as said battery-saving receiving information so that said time may be associated with said battery-saving receiving period.

4. The radio telecommunication system according to claim 3, wherein in case blocking information is already recorded in association with a mobile station ID of a mobile station in an area, each of said cell sites informs said mobile station of said blocking information at timing calculated from said time when the cell site has been informed of the battery-saving receiving period and from said battery-saving receiving period.

5. The radio telecommunication system according to claim 1, wherein said paging request is made by a PBX (Private Branch Exchange) or a public switched telephone network control unit.

6. In a radio telecommunication system including a plurality of cell sites individually taking charge of predetermined areas each site having a cell site memory and mobile stations having a function of intermittently receiving signals each station having a mobile station memory, a radio telecommunication method for holding down blocking to the minimum and reducing the power consumption in the mobile station, comprising the steps of:

storing, in the cell site memory of each cell site, a mobile station identification periodically transmitted from a mobile station existing in each area, battery-saving receiving period information, and battery-saving receiving time, so as to be associated with each other, in a cell site memory by using a cell site internal timer for sensing time;
   storing blocking information indicating that blocking has occurred, in case a paging signal is sent to a mobile station in an area in response to a paging request made by a PBX (Private Branch Exchange) or a public switched telephone network control unit and an answer is not returned from the mobile station in response to the paging signal, in said cell site memory so as to be associated with a mobile station ID on said cell site memory;
   informing the mobile station of the blocking information according to the information on said cell site memory;

storing, in the mobile station, battery-saving receiving period information to intermittently exercise on /off control over a receiving unit, by using a mobile station internal timer for sensing the time; and periodically transmitting said battery-saving receiving period information to a cell site and increasing /decreasing the battery-saving receiving period information on said mobile station memory according to presence /absence of blocking information fed from said cell site to control the battery-saving receiving period.

7. The radio telecommunication method according to claim 5, wherein said paging request is made by a PBX (Private Branch Exchange) or a public switched telephone network control unit.

* * * * *